United States Patent
Yamasaki

(10) Patent No.: US 8,614,965 B2
(45) Date of Patent: Dec. 24, 2013

(54) PACKET LOSS FREQUENCY MEASURING SYSTEM, PACKET LOSS FREQUENCY MEASURING METHOD, AND PROGRAM

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 241 days.

(21) Appl. No.: 13/120,623

(22) PCT Filed: Sep. 29, 2009

(86) PCT No.: PCT/JP2009/004966
§ 371 (c)(1),
(2), (4) Date: Mar. 23, 2011

(87) PCT Pub. No.: WO2010/047044
PCT Pub. Date: Apr. 29, 2010

(65) Prior Publication Data
US 2011/0194453 A1    Aug. 11, 2011

(30) Foreign Application Priority Data
Oct. 24, 2008   (JP) .................................. 2008-273750

(51) Int. Cl.
*H04L 12/26*   (2006.01)

(52) U.S. Cl.
USPC .......................................... 370/252; 370/236

(58) Field of Classification Search
USPC .............................. 370/252, 236, 392, 395.32
See application file for complete search history.

(56) References Cited

U.S. PATENT DOCUMENTS

| 2007/0025374 A1* | 2/2007 | Stefan et al. ................... 370/401 |
| 2007/0239889 A1* | 10/2007 | Mochida et al. .............. 709/237 |
| 2007/0291782 A1* | 12/2007 | Basso et al. .................... 370/428 |
| 2008/0215883 A1* | 9/2008 | Fok et al. ........................ 713/167 |
| 2009/0109858 A1* | 4/2009 | Yamasaki et al. ............. 370/242 |
| 2009/0271508 A1* | 10/2009 | Sommers et al. .............. 709/224 |
| 2009/0293114 A1* | 11/2009 | Mustafa .......................... 726/13 |

FOREIGN PATENT DOCUMENTS

| JP | 11-205386 A | 7/1999 |
| JP | 2004147183 A | 5/2004 |
| JP | 2004320248 A | 11/2004 |
| JP | 2006311564 A | 11/2006 |
| JP | 2008017407 A | 1/2008 |
| JP | 2008219127 A | 9/2008 |
| WO | 2006043624 A | 4/2006 |
| WO | 2007/104192 A1 | 9/2007 |

OTHER PUBLICATIONS

T. Ogishi et al., "Design of Performance Monitor Collecting TCP Level Statistics from Unidirectional IP Traffic", Proceedings of the 2000 IEICE General Conference, B-7-3, 2000, pp. 96.
Japanese Office Action for JP2010-534665 mailed on Jun. 11, 2013 with Partial English Translation.

* cited by examiner

*Primary Examiner* — Brian D Nguyen

(57) ABSTRACT

In a system, there is provided a packet information registration section for selecting one of the plurality of packet information storage areas upon receiving a packet and storing, in the selected packet information storing area, information corresponding to the field values including at least the acknowledgment number in the received packet, and a counting section for counting the number of pieces of information commonly stored in packet information storage areas equal in number two or more than a predetermined number.

20 Claims, 9 Drawing Sheets

PACKET LOSS FREQUENCY MEASURING SYSTEM, PACKET LOSS FREQUENCY MEASURING METHOD, AND PROGRAM

TECHNICAL FIELD

The present invention relates to a packet loss frequency measuring system for measuring the packet loss frequency as the quality of a communication network, and an information registration device, an information counting device, a packet loss frequency measuring method, a packet loss frequency measuring program, an information registration program and an information counting program applied to the packet loss frequency measuring system.

BACKGROUND ART

A method of detecting packet loss in end-to-end communication is described in Non Patent Literature 1. For example, the method described in Non Patent Literature 1 is applied to equipment for measuring the quality of communication between terminals in a communication network connecting many terminals. In the method described in Non Patent Literature 1, a packet capturing section is provided in a path between terminals so that this capturing section will fully capture packets passing through the path. The capturing section has the acknowledgment numbers of the passed packets, and when two or more packets have the same acknowledgment number (i.e., when a duplicate ACK phenomenon has occurred), it detects packet loss.

FIG. 13 is a block diagram showing an example of measuring equipment for detecting packet loss by the method described in Non Patent Literature 1. It is considered, as shown in FIG. 13, a configuration of packet loss measuring equipment 210 to which the method described in Non Patent Literature 1 is applied, which includes a flow identifying means 211, a database (hereinafter abbreviated as DB) 215, a counter/DB reading means 212, a number comparing means 213 and a counter/DB writing means 214. The DB 215 stores, on a flow-by-flow basis, an acknowledgment number in the previous packet in the same flow and a count value indicative of the number of times the acknowledgment number is duplicated. When an individual packet 91 is read, the flow identifying means 211 identifies the flow of the packet. The flow of the packet is identified based on sender and destination IP addresses, send and destination port numbers, a protocol ID and the like. In FIG. 13, each packet indicated by the solid line belongs to the same flow, and each packet indicated by the broken line belongs to another flow.

The counter/DB reading means 212 reads, from the DB 215, the acknowledgment number of the previous packet in the same flow as a new packet identified by the flow identifying means 211 and the count value indicative of the number of times the acknowledgment number is duplicated. The number comparing means 213 compares the acknowledgment number of the new packet identified by the flow identifying means 211 with the acknowledgment number of the previous packet in the same flow. If they match, one is added to the read count value, while if they do not match, the count value is not changed. After this processing, the counter/DB writing means 214 stores, in the DB 215, the acknowledgment number of the new packet and the count value after being subjected to the processing by the number comparing means 213.

Methods of estimating packet loss are also described in Patent Literatures 1 and 2, for example. Further, Patent Literature 3 teaches communication equipment, which refers to a learning table storing port numbers of packets received in the past and a frame storage memory storing the port number of a newly received packet to compare the port number of the newly received packet with those of the past packets. Further, Patent Literature 4 teaches an IP packet counting method for classifying packets based on their port numbers to count the number of packets in a table.

CITATION LIST

Patent Literatures

Patent Document 1 Domestic Re-publication of PCT International Application Publication No. WO2006/043624 (Paragraphs 0025, 0047 and 0052)
Patent Document 2 Japanese Patent Application Laid-Open No. 2008-219127 (Paragraphs 0110 to 0114)
Patent Document 3 Japanese Patent Application Laid-Open No. 2004-320248 (Paragraphs 0086 and 0087)
Patent Document 4 Japanese Patent Application Publication No. 11-205386 (Paragraphs 0024 to 0026)

Non Patent Literature

[Non Patent Document 1] Tomohiko Ogishi, Akira Idoue, Toru Hasegawa, and Toshihiko Kato, "Design of Performance Monitor Collecting TCP Level Statistics from Unidirectional IP Traffic," Proceedings of the 2000 IEICE General Conference, p. 96.

SUMMARY OF INVENTION

Technical Problem

In order to detect a duplicate acknowledgment number by the method described in Non Patent Literature 1 or the like, it is necessary to observe a packet received in a flow immediately before a packet when the packet received to check for the acknowledgment number. If the received packet and the previous packet match in terms of the acknowledgment number, it is recognized that the acknowledgment number is duplicated, while if the acknowledgment numbers do not match, it is recognized that there no duplication. Since this operation is state processing, the costs of processing for measuring the quality of a communication network (processing time and the amount of calculation) are increased. The state processing means that it cannot be determined what to do only by referring to one packet to be observed. In the method described in Non Patent Literature 1, since not only the newly received packet but also the previously received packet are referred to decide the processing, the costs such as processing time are increased.

Further, in order to detect a duplicate acknowledgment number in the configuration illustrated in FIG. 13, even if a new packet arrives, the counter/DB reading means 212 cannot start reading of the acknowledgment number of the previous packet until the counter/DB writing means 214 writes, into the DB 215, the acknowledgment number of the previous packet in the same flow as the new packet. Therefore, the upper limit on the processing speed for measuring packet loss is limited to the speed of the sequence of operations performed by the counter/DB reading section 212, the number comparing section 213 and the counter/DB writing means 214.

The frequency of duplication of an acknowledgment number becomes an index of the packet loss, and the duplication of the acknowledgment number is observed among two or more packets. In the configuration shown in FIG. 13, since a comparison with the previous packet is made when a packet has newly arrived, the processing costs become high. The frame storage memory and the learning table described in Patent Literature 3 store port numbers. Even if they are configured to store acknowledgment numbers instead of the port numbers, since a comparison with a new packet cannot be made unless an acknowledgment number of the previous packet is stored in the learning table, the processing costs become high like in the configuration shown in FIG. 13. In addition, a mere comparison between the frame storage memory and learning table cannot lead to a determination of how many acknowledgment numbers are duplicated.

Therefore, it is an object of the present invention to provide a packet loss frequency measuring system for measuring the packet loss frequency at low processing costs, and an information registration device, an information counting device, a packet loss frequency measuring method, a packet loss frequency measuring program, an information registration program and an information counting program applied to the packet loss frequency measuring system.

Solution to Problem

A packet loss frequency measuring system according to the present invention comprises: packet information storage means having a plurality of packet information storage areas for storing information corresponding to field values including at least an acknowledgment number in a packet; packet information registration means for selecting one of the plurality of packet information storage areas upon receiving a packet and storing, in the selected packet information storing area, information corresponding to the field values including at least the acknowledgment number in the received packet; and counting means for counting the number of pieces of information commonly stored in packet information storage areas equal in number to or more than a predetermined number.

An information registration device according to the present invention comprises packet information registration means for selecting one of a plurality of packet information storage areas upon receiving a packet and storing, in the selected packet information storing area, information corresponding to field values including at least an acknowledgment number of the received packet.

An information counting device according to the present invention comprises counting means for referring to information stored in a plurality of packet information storage areas storing information corresponding to field values including at least an acknowledgment number in a packet to count the number of pieces of information commonly stored in packet information storage areas equal in number to or more than a predetermined number.

A packet loss frequency measuring method according to the present invention comprises: a packet information registration step of selecting one of a plurality of packet information storage areas upon receiving a packet and storing, in the selected packet information storing area, information corresponding to field values including at least an acknowledgment number in the received packet; and a counting step of counting the number of pieces of information commonly stored in packet information storage areas equal in number to or more than a predetermined number.

A packet loss frequency measuring program according to the present invention makes a computer perform: packet information registration processing for selecting one of a plurality of packet information storage areas upon receiving a packet and storing, in the selected packet information storing area, information corresponding to field values including at least an acknowledgment number in the received packet; and counting processing for counting the number of pieces of information commonly stored in packet information storage areas equal in number to or more than a predetermined number.

An information registration program according to the present invention causes a computer to perform packet information registration processing for selecting one of a plurality of packet information storage areas upon receiving a packet and storing, in the selected packet information storing area, information corresponding to field values including at least an acknowledgment number of the received packet.

An information counting program according to the present invention causes a computer to perform counting processing for referring to information stored in a plurality of packet information storage areas storing information corresponding to field values including at least an acknowledgment number in a packet to count the number of pieces of information commonly stored in packet information storage areas equal in number to or more than a predetermined number.

Advantageous Effects of Invention

According to the present invention, the packet loss frequency can be measured at low processing costs.

DESCRIPTION OF EMBODIMENTS

Embodiments of the present invention will now be described with reference to the accompanying drawings.

Figure 1:
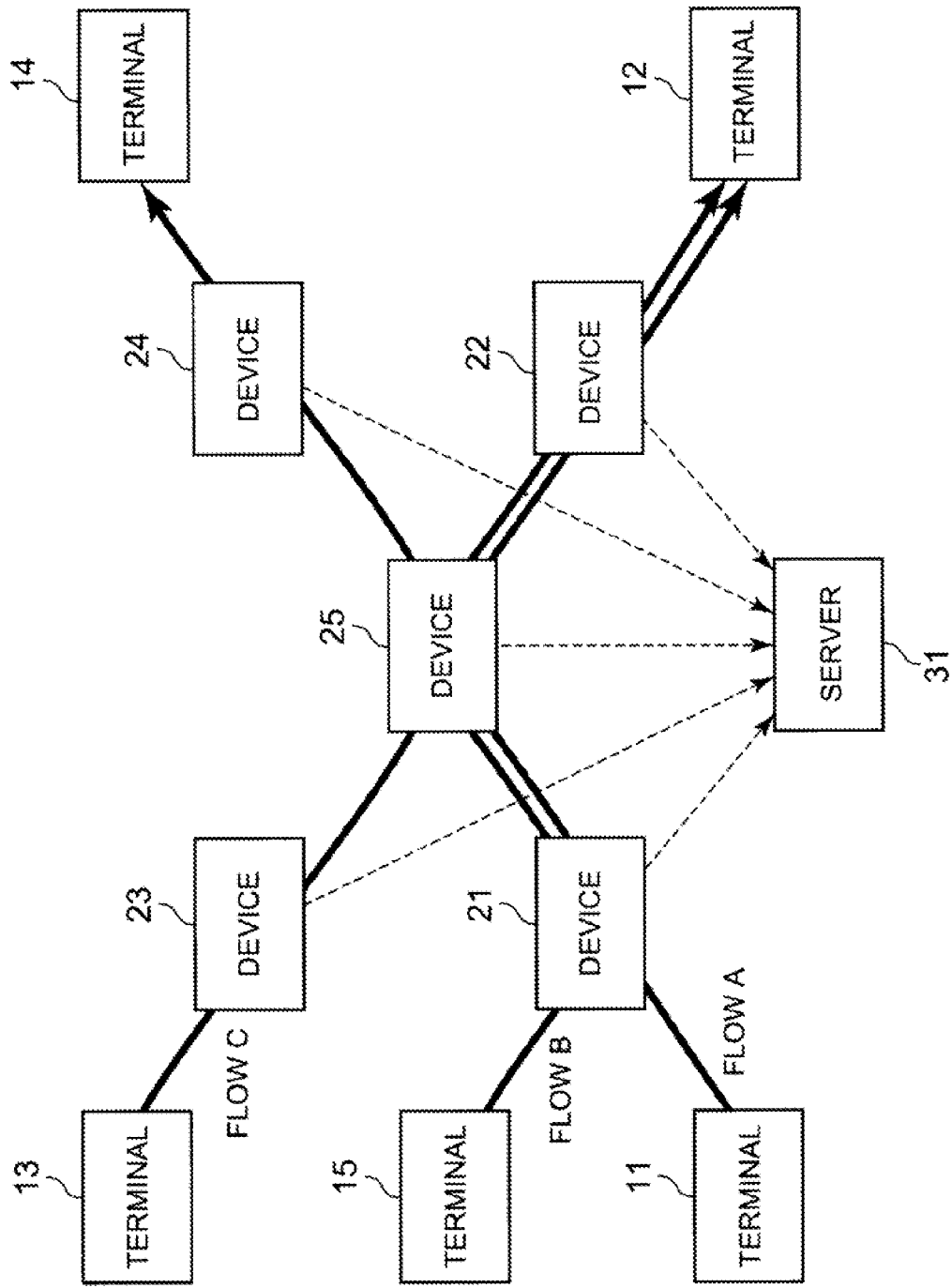
[FIG. 1] It depicts an explanatory drawing showing an example of the layout of a packet loss frequency measuring system.

FIG. 1 is an explanatory drawing showing an example of the layout of a packet loss frequency measuring system. In the example shown in FIG. 1, each of terminals 11 to 15 sends and receives packets to communicate with each other. Then, the packet loss frequency measuring system is arranged on a communication path between terminals in a communication network. In the example shown in FIG. 1, each of devices 21 to 25 corresponds to the packet loss frequency measuring system, respectively. Each device 21-25 measures the packet loss frequency (i.e., the frequency of occurrence of packet loss), respectively. Further, in the example shown in FIG. 1, each device 21-25 outputs the measured packet loss frequency to a server 31. The server 31 manages the packet loss frequency in each device 21-25.

Each device 21-25 measures the frequency of occurrence of packet loss for each flow of packets, respectively. For example, the device 25 shown in FIG. 1 is located on a communication path between terminals 11 and 12, also located on a communication path between terminals 15 and 12, and further located on a communication path between terminals 13 and 14. Thus, the terminal 25 lets packets in a flow from the terminal 11 to the terminal 12 (hereinafter referred to as flow A), packets in a flow from the terminal 15 to the terminal 12 (hereinafter referred to as flow B) and packets in a flow from the terminal 13 to the terminal 14 (hereinafter referred to as flow C) pass through. Then, the terminal 25 calculates the packet loss frequency for each flow of packets such as flow A, B or C.

The packet loss frequency measuring system of the present invention aims at a protocol for causing a terminal on a data receiving side to send a terminal on a data sending side information (acknowledgment number) for checking how many pieces of data preceded before the last one has arrived at the terminal on the receiving side. A typical example of such a protocol is TCP (Transmission Control Protocol), but the protocol to which the present invention is applicable is not limited to TCP. For example, the present invention may also be applied to SCTP (Stream Control Transmission Protocol). The present invention can be applied to even UDP (User Datagram Protocol) as long as a unique protocol is defined to add a sequence number, which indicates how many pieces of data preceded before the last one has arrived at the terminal on the receiving side, to a payload in an application layer is defined.

The devices 21 to 25 shown in FIG. 1 may be nodes such as a router, a switch and the like existing in the communication network, or a device for performing analysis based on information input from TAP, a mirror port of the device and the like.

Figure 2:
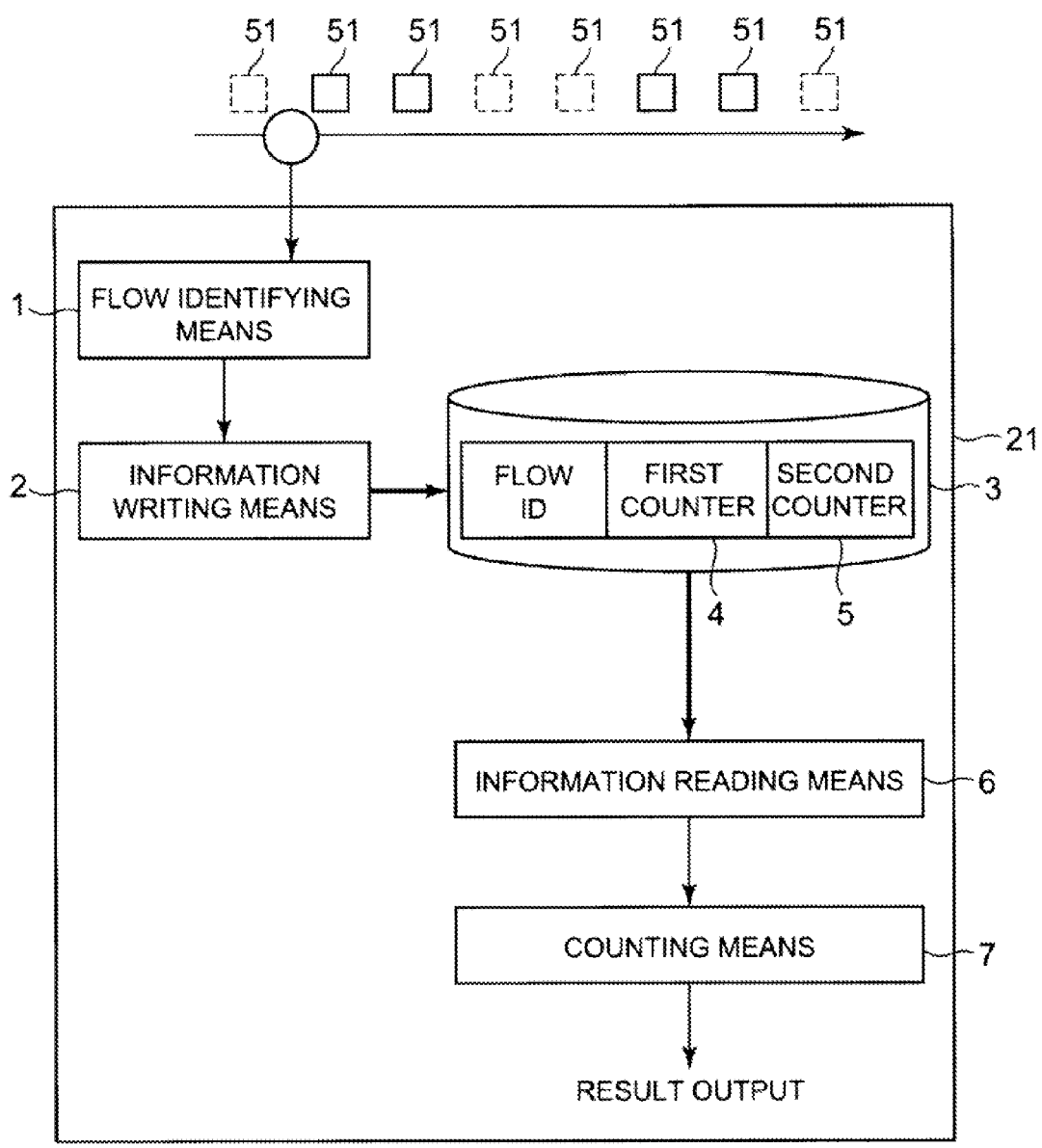
[FIG. 2] It depicts a block diagram showing an exemplary embodiment of a packet loss frequency measuring system according to the present invention.

FIG. 2 is a block diagram showing an exemplary embodiment of a packet loss frequency measuring system of the present invention. Note that, although FIG. 2 illustrates a block diagram of the device 21 corresponding to the packet loss frequency measuring system, the devices 21 to 25 in FIG. 1 have similar configurations. The packet loss frequency measuring system of the present invention includes a flow identifying means 1, an information writing means 2, a packet information holding means 3, an information reading means 6 and a counting means 7.

The flow identifying means 1 receives a packet 51 passing through the packet loss frequency measuring system and identifies the follow of the packet 51. The flow identifying means 1 regards, as the same flow, a packet group in which the received packets have the same specific field, and classifies packets on a flow-by-flow basis. For example, a set of any one or more of items among a source IP address, a destination IP address, a source port number, a destination port number, a sender MAC address, a recipient MAC address and a protocol ID (identification information on the protocol) is predetermined, and if each item in the set is the same in two or more packets, the flow identifying means 1 regards the two or more packets as the same flow. Here, the source IP address, the destination IP address, the source port number, the destination port number, the sender MAC address, the recipient MAC address and the protocol ID are exemplified, but a port number of the packet loss frequency measuring system may also be used as one item for identifying a flow of packets. In other words, the flow identifying means 1 determines a set of at least some items in a packet among the sender address, the recipient address, the source port number, the destination port number, the protocol ID and the port number of the packet loss frequency measuring system, and if the items in the set are the same in two or more packets, it can classify the two or more packets as one group. The port number of the packet loss frequency measuring system is the number of a port receiving a packet and sending the packet to the next node among plural ports in the device sending and receiving packets as the packet loss frequency measuring system.

In FIG. 2, each packet indicated by the solid line belongs to the same flow, and each packet indicated by the broken line belongs to another flow.

The packet information holding means 3 is a storage device having plural packet information storage areas 4 and 5 for each flow to store information corresponding to field values including at least the acknowledgment number in a packet. Here, description will be made by taking, as an example, a case where the packet information storage areas 4 and 5 storing the information corresponding to field values including at least the acknowledgment number in a packet are storage areas for storing bit strings having a predetermined bit length. Further, in this case, the packet information storage areas 4 and 5 are referred to as counters. Here, a case is taken as an example in which the packet loss frequency measuring system causes the counters 4 and 5 to store values corresponding to acknowledgment numbers in received packets.

Here, a case is taken as an example in which the two counters 4 and 5 are used for one flow, but the number of counters (packet information storage areas) used for one flow is not limited to two as long as the number is more than one. In the following, one of the two counters is referred to as a first counter 4 and the other is referred to as a second counter 5.

After the flow identifying means 1 receives a packet and classifies the packet on a flow-by-flow basis, the information writing means 2 selects one counter from the plural counters (the two counters 4 and 5 in this example) corresponding to a group into which the packet is classified, and stores, in the selected counter, information corresponding to the acknowledgment number of the received packet. In the exemplary embodiment, the first counter 4 and the second counter 5 are storage areas for storing bit strings having a predetermined bit length. The following description will be made by taking a case as an example in which the information writing means 2 stores 1 in a bit position corresponding to the acknowledgment number in a bit string having a predetermined bit length as information corresponding to the acknowledgment number of the received packet.

A method of causing the information writing means 2 to select one from the plural counters may be to select a counter at random, for example. When a counter is selected at random, random numbers may be used. For example, values of random numbers may be assigned equally to each of the counters 4 and 5 so that when a counter is selected, a random number will be generated to select the value of the random number corresponding to the counter. Further, the information writing means 2 may select a counter by a round-robin method to select each counter in turn. For example, a counter may be selected for each received packet in the following order: the first counter 4, the second counter 5, the first counter 4, the second counter 5 and so on. Further, each counter may be weighted beforehand with the probability of being selected so that a counter will be selected according to the probability. For example, the weighting may be predetermined in such a manner that the probability of the first counter 4 being selected is P and the probability of the second counter 5 being selected is 1-P so that either counter will be selected according to the probability of selection.

The information writing means 2 causes the selected counter to store 1 in a bit position corresponding to the acknowledgment number in the bit string having the predetermined bit length.

A method of determining a correspondence between the acknowledgment number and the bit position in the bit string may be, for example, a method of simply defining a direct correspondence between each acknowledgment number and a bit position in the bit string. In other words, an acknowledgment number may be assigned directly to each bit position in the bit string so that upon receiving a packet, the information writing means 2 will store "1" in a bit position to which the acknowledgment number of the packet is assigned.

It may also be a method of predefining a hash function to associate hash values obtained by using the hash function with bit positions in the bit string. In this case, each hash value obtained by using the hash function may be associated with each bit position in the bit string so that the information writing means 2 will calculate the hash value for the acknowledgment number of a received packet using the hash function and store "1" in a bit position corresponding to the hash value obtained by the calculation. Algorithms for storing "1" in the position corresponding to the hash value for the acknowledgment number calculated using the hash function include, for example, Bloom Filter, and Space-Code Bloom Filter and Multi-Resolution Space-Code Bloom Filter as applications of Bloom Filter. The information writing means 2 may perform processing for storing 1 in a bit position corresponding to the acknowledgment number in the bit string according to the Bloom Filter or the Space-Code Bloom Filter or the Multi-Resolution Space-Code Bloom Filter. It can be said that the hash value is the result of converting the acknowledgment number using the hash function.

Figure 3:
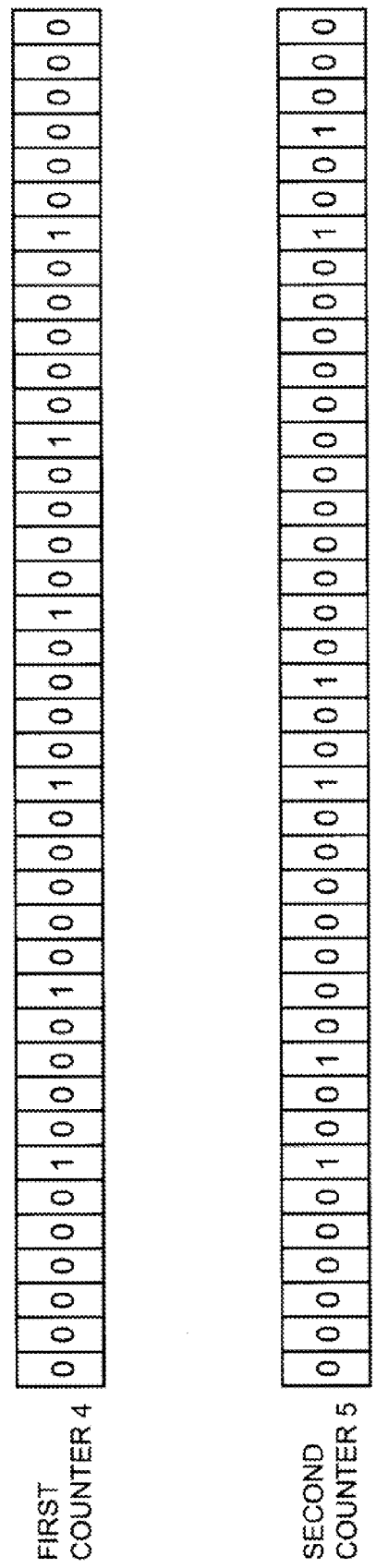
[FIG. 3] It depicts an explanatory drawing showing an example of bit strings.

FIG. 3 shows an example of bit strings having a predetermined bit length and stored in each of the counters 4 and 5, respectively. The information writing means 2 calculates a hash value for the acknowledgment number of the received packet, for example, according to the Bloom Filter. When selecting the first counter 4, the information writing means 2 stores "1" in a bit position corresponding to the hash value in the bit string of the first counter 4. When selecting the second counter 5, the information writing means 2 stores "1" in a bit position corresponding to the hash value in the bit string of the second counter 5.

Further, it may be a method of associating, with a bit position in the bit string, a remainder obtained by dividing an acknowledgment number by a predetermined fixed value. In this case, the remainder obtained by dividing the acknowledgment number by the fixed value is associated with each bit position in the bit string, and upon receiving a packet, the information writing means 2 may divide the acknowledgment number of the packet by the fixed value to obtain a remainder, and store "1" in a bit position corresponding to the remainder.

The flow identifying means 1 and the information writing means 2 perform the above-mentioned processing each time an individual packet is received. In other words, the flow identifying means 1 identifies a packet flow for each received packet. The information writing means 2 performs processing for selecting one counter from the plural counters corresponding to the packet flow for each received packet and storing information in the counter according to the acknowledgment number of the packet.

On the other hand, the information reading means 6 and the counting means 7 to be mentioned below do not need to perform processing each time a packet is received. The information reading means 6 performs processing for reading a bit string from each counter irrespective of packet reception, and following the bit string reading processing performed by the information reading means 6, the counting means 7 performs processing.

The information reading means 6 reads bit strings stored in the plural counters corresponding to each individual flow and passes them to the counting means 7. As mentioned above, the information reading means 6 may perform this processing irrespective of the arrival of a packet. For example, the information reading means 6 may read bit strings from the counters periodically. Alternatively, the information reading means 6 may trigger instructions from or events in external systems to read bit strings at random times.

Among the plural counters corresponding to one flow, the counting means 7 counts the number of pieces of information commonly stored in a predetermined number of counters or more. This "predetermined number" is referred to as the common number below. The common number can be determined from values of not less than two and not more than N where the number of plural counters corresponding to one flow is N. In this example, the number of counters corresponding to one flow is two and the common number is two. Therefore, in the example, the counting means 7 counts the number of pieces of information commonly stored in the two counters. Further, in the example, information corresponding to acknowledgment information is stored as "1" in a bit position corresponding to the acknowledgment information. The information commonly stored in each counter is "1" stored in the same bit position. Thus, the counting means 7 has only to perform AND (logical multiplication) operation on bit strings of the first counter 4 and the second counter 5 to count the number of "1s" in a resulting bit string.

Figure 4:
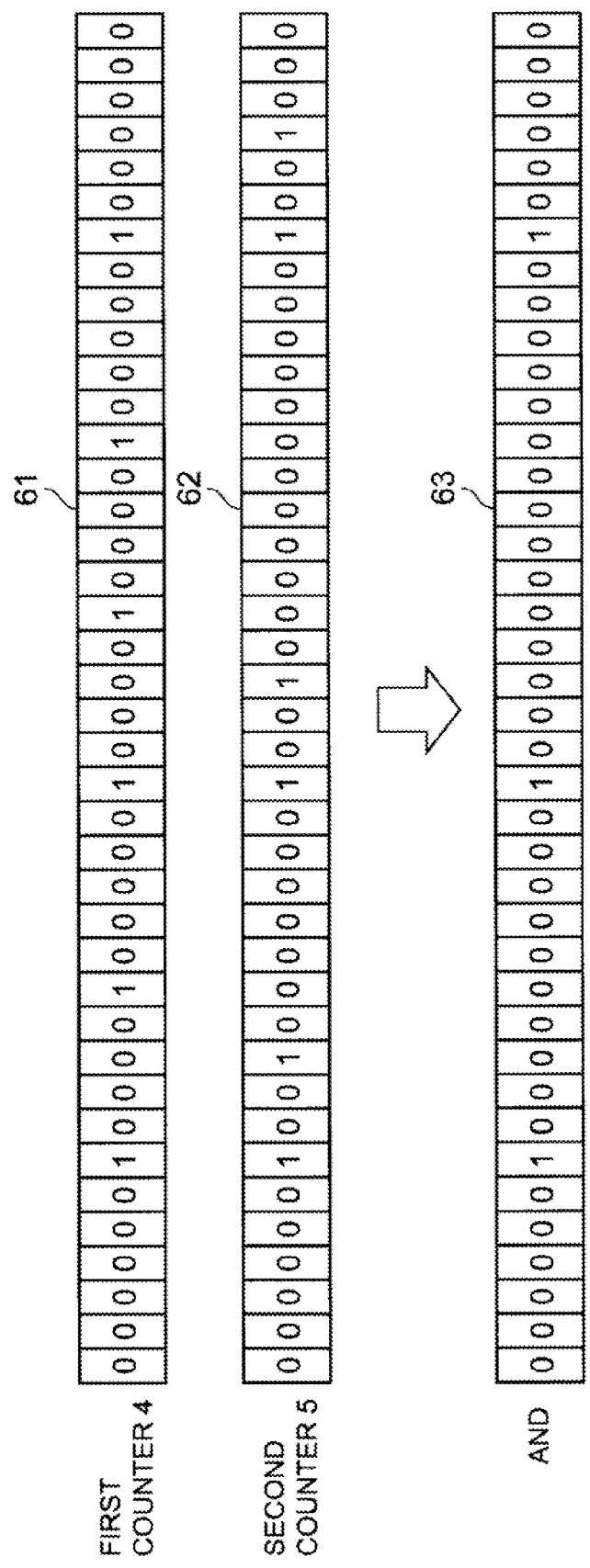
[FIG. 4] It depicts an explanatory drawing showing processing performed by counting means.

FIG. 4 is an explanatory drawing showing processing performed by the counting means 7. For example, suppose that the first counter 4 stores a bit string 61 (see FIG. 4) and the second counter 5 stores a bit string 62, and the information reading means 6 reads these bit strings 61 and 62. In this case, the counting means 7 performs AND operation on these bit strings 61 and 62 to obtain a bit string 63 shown in FIG. 4. Then, the counting means 7 counts the number of "1s" in the bit string 63 obtained by the AND operation. In the example shown in FIG. 4, the counting result is three.

If no packet loss occurs, since no packets with an acknowledgment number duplicated in the same flow are sent, a packet with a certain acknowledgment number will pass through a measure point only once. As a result, "1" in a bit position corresponding to the acknowledgment number is stored only in one of the two counters 4 and 5, and as a result of the AND operation of the bit strings of the first counter 4 and the second counter 5, the value in the bit position becomes zero. On the other hand, if packet loss has occurred, two or more packets with the same acknowledgment number are sent, and when each of the packets passes through the packet loss frequency measuring system, "1" is stored in the same bit position of the respective counters 4 and 5. Thus, since the number of "1s" in the bit string obtained by the AND operation of the bit strings of the respective counters 4 and 5 is a value representing the packet loss frequency, the more the number of "1s," the more the number of packet losses. It can be said that "1s" in the bit string obtained by the AND operation represent the number of pieces of information commonly stored in a number of counters equal to or more than the common number.

Here, a case is taken as an example in which the number of counters for one flow is two and the common number is two, but as already discussed, the number of counters for one flow may not be two as long as it is more than one. For example, the number of counters for one flow may be three, four or the like. The common number is not limited to two as well. The more the number of counters for one flow, the more the number of packets can be processed in parallel, and this makes it easier to speed up the processing for determining the packet loss frequency.

In the exemplary embodiment, for example, the flow identifying means 1, the information writing means 2, the information reading means 6 and the counting means 7 are implemented by a CPU operating according to a program (packet loss frequency measuring program). The program may be stored in a storage device provided in the packet loss frequency measuring system and read by the CPU of the packet loss frequency measuring system to operate as the flow identifying means 1, the information writing means 2, the information reading means 6 and the counting means 7. Alternatively, each means may be implemented as each individual unit.

Next the operation will be described.

Figure 5:
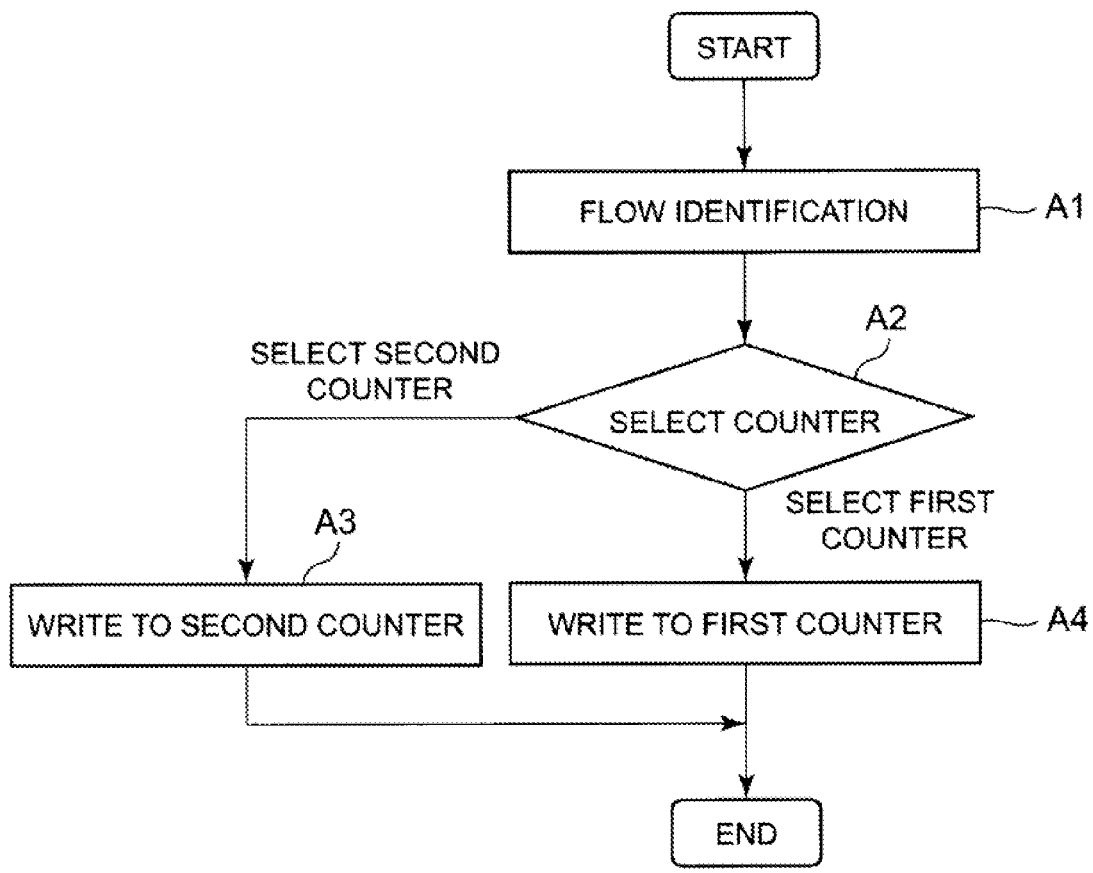
[FIG. 5] It depicts a flowchart showing an example of the progress of processing upon packet reception.

FIG. 5 is a flowchart showing an example of the progress of processing upon packet reception. When receiving a packet to be exchanged between terminals, the packet loss frequency measuring system forwards the packet to the next node. At this time, the following processing is performed on the received packet.

First, the flow identifying means 1 identifies the flow of a received packet (step A1). For example, the flow identifying means 1 may specify a flow ID for identifying the flow from the sender address, the recipient address, the source port number, the destination port number and the protocol ID in the header of the packet. The flow identifying means 1 may also refer to port numbers of the packet loss frequency measuring system (the numbers of a port in its device at which the packet has received and a port from which the packet is sent to the next node) to identify the flow of the packet.

Next, the writing means 2 selects one counter from the plural counters corresponding to the flow of the received packet (step A2). Here, as shown in FIG. 2, the case is taken as an example in which the first counter 4 and the second counter 5 are used for each flow. The mode of selecting a counter by the writing means 2 is not particularly limited. For example, a counter may be selected at random, in round-robin fashion or according to the probability of selection defined for each individual counter.

If the first counter 4 is selected in step A2, the writing means 2 stores, in the first counter 4, information corresponding to the acknowledgment number of the received packet (step A4). On the other hand, if the second counter 5 is selected in step A2, the writing means 2 stores, in the second counter 5, information corresponding to the acknowledgment number of the received packet (step A5). In this example, it is assumed that 1 is stored in a bit position corresponding to the acknowledgment number in a bit string of the counter selected in step A4 or A5. As already discussed, the acknowledgment number and the bit position may be associated with each other beforehand. Further, the hash value of the acknowledgment number may be associated with the bit position. In addition, the processing for storing 1 in a bit position corresponding to the acknowledgment number in the bit string may be performed according to Bloom Filter or Space-Code Bloom Filter or Multi-Resolution Space-Code Bloom Filter.

Figure 6:
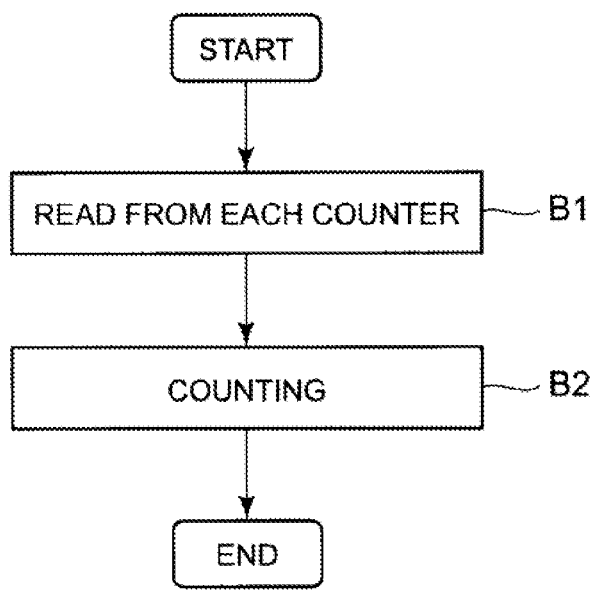
[FIG. 6] It depicts a flowchart showing an example of the progress of processing performed by information reading means and counting means.

Next, processing performed by the information reading means 6 and the counting means 7 irrespective of packet reception will be described. FIG. 6 is a flowchart showing an example of the progress of this processing. Here, a case is taken as an example in which the processing shown in FIG. 6 is performed periodically. The information reading means 6 and the counting means 7 perform the following processing on a flow-by-flow basis.

The information reading means 6 reads information (bit strings in this example) stored for each individual flow in the plural counters corresponding to the flow (step B1). After step B1, the counting means 7 counts information commonly stored in the common number (two in this example) of counters (step B2). In other words, here, the number of bit positions in which "1" is stored in both counters has only to be counted. The counting means 7 has only to perform AND operation on the two bit strings read by the information reading means 6 to count the number of "1s" in a bit string obtained as a result of the AND operation.

The counting result in step B2 represents the packet loss frequency of each flow. In other words, it is shown that the larger the value of the counting result in step B2, the more the number of occurrences of packet loss, or the smaller the value of the counting result, the less the number of occurrences of packet loss.

The packet loss frequency measuring system may send the packet loss frequency (the counting result in step B2) to the server 31 shown in FIG. 1, for example. Then, the server 31 may store the packet loss frequency received from each packet loss frequency measuring system.

In this example, the case where the number of counters corresponding to one flow is two is exemplified, but the number of counters corresponding to one flow may be three or more. In this case, the counting means 7 counts information commonly stored in the common number of counters or more. If the number of counters corresponding to one flow matches the common number, the counting means 7 may determine a logical product of bit strings in the respective counters and count the number of "1s" included in a resulting bit string. If the common number is smaller than the number of counters corresponding to one flow, the counting means 7 may check each bit position as to whether "1" is stored in the common number of counters or more to count the number of bit positions in which "1" is stored in the common number of counters or more.

According to the present invention, the information writing means 2 selects one of the plural counters (packet information storage areas) and stores, in the counter, information corresponding to the acknowledgment number of a packet. Then, the information stored in each counter is read, and the number of pieces of information commonly stored in the common number of counters or more is counted. In such a configuration, when a packet is received, the information writing means 2 has only to select a counter and perform writing to the counter without the need to compare the packets received in the past with a newly received packet. Thus, the processing upon receiving a packet is stateless processing, so that the processing costs such as the processing time and the amount of calculation can be reduced. Further, the values in each counter can be referred to irrespective of the timing of receiving a packet to perform counting. Thus, when the counting means 7 performs counting, there is no need to wait for completion of the processing performed by the information writing means 2, and hence the processing speed of the counting means 7 is not limited by the information writing means 2. Further, the plural counters exist. Therefore, when one packet is received and writing to the selected counter is being performed (step A3 or step A4), even if another packet belonging to the same flow is received, processing for the packet can be performed, thereby speeding up the processing.

Figure 7:
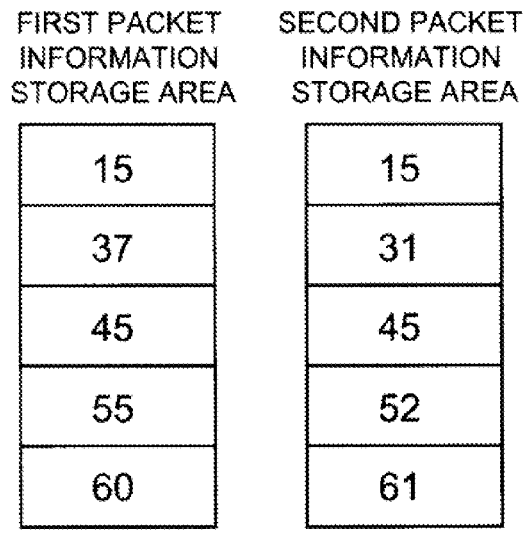
[FIG. 7] It depicts an explanatory drawing schematically showing an example of storing information corresponding to acknowledgment numbers of packets in packet information storage areas as arrays.

In the above-mentioned exemplary embodiment, the description is made by taking the case as an example in which the packet information storage areas (counters) 4 and 5 are storage areas for storing bit strings having a predetermined bit length and "1" is stored in a position corresponding to the acknowledgment number of a received packet. The information corresponding to the acknowledgment number of the received packet may also be stored in the packet information storage areas 4 and 5 according to another exemplary embodiment. FIG. 7 is an explanatory drawing schematically showing an example of storing information corresponding to the acknowledgment numbers of packets in the packet information storage areas as arrays. Each of values such as 15, 37, 45, ... shown in FIG. 7 represents information corresponding to the acknowledgment number of each packet. After selecting one of the plural packet information storage areas, the information writing means 2 may store, in the selected packet information storing area, information corresponding to the acknowledgment number itself as an element in the array. Note that, if the information to be stored has already been stored in the selected packet information storing area, the information does not need storing.

The information reading means 6 reads the array stored in each packet information storage area on a flow-by-flow basis. The counting means 7 has only to count the number of pieces of information commonly stored in the packet information storage areas equal in number to or more than the common number on a flow-by-flow basis. The counting result represents the packet loss frequency of each flow. For example, suppose that two packet information storage areas are used for one flow, the common number is two, and the arrays illustrated in FIG. 7 are stored. In this case, the counting means 7 counts the pieces of information "15" and "45" commonly stored in the two arrays to obtain two as the counting result.

Further, in the above-mentioned exemplary embodiment, the description is made by taking the case as an example in which information corresponding to the acknowledgment number of a received packet is stored in a packet information storage area, but information corresponding to a combination of the acknowledgment number and other information may be stored in the packet information storage area. For example, if the packet loss frequency of TCP packets is measured, information corresponding to a combination of the acknowledgment number included in the header of a packet, the advertisement window size and the ACK flag may be stored in the packet information storage area. For example, a correspondence between a combination of the acknowledgment number, the advertisement window size and the ACK flag, and a bit position in a bit string may be predetermined so that if the value of the acknowledgment number of a received packet is denoted as S, the value of the advertisement window size is denoted as T and the value of the ACK flag is denoted as U, "1" will be stored in a bit position corresponding to the combination of S, T and U. Further, a hash value for the combination of S, T and U may be determined using the hash function so that "1" will be stored in a bit position corresponding to the hash value. At this time, Bloom Filter, Space-Code Bloom Filter or Multi-Resolution Space-Code Bloom Filter may be applied. Alternatively, the combination of the acknowledgment number, the advertisement window size and the ACK flag for each received packet may be stored as an array.

In this case, even if packets match each other in terms of the acknowledgment number, if other pieces of information (the advertisement window size and the ACK flag in the above example) do not match, it cannot be said that information is commonly stored in plural packet information storage areas.

In a similar way, the information writing means 2 may store, in the selected packet information storing area, information corresponding to a combination of the acknowledgment number and one or more of the advertisement window size, the ACK flag, the sender address, the recipient address, the source port number, the destination port number and the protocol ID.

In the above-mentioned exemplary embodiment, the description is made by taking the case as an example in which the plural packet information storage areas are used for each flow, but the plural packet information storage areas may be used for each port or each terminal. In this case, the frequency of packet loss in the entire group of flows passing through the port or in the entire group of flows of packets sent from and received at the terminal. In this case, note that since the acknowledgment numbers of packets may match even if the flows are different, information corresponding to a combination of the acknowledgment number of each packet and the flow is stored in the selected packet information storing area.

For example, when the communication quality is measured for each combination of a sending terminal and a receiving terminal, plural packet information storage areas are prepared for each combination of the address of a terminal as the sending terminal and the address of a terminal as the receiving terminal. Then, for example, the information writing means 2 stores, in a packet information storage area, information corresponding to a combination of the acknowledgment number, the advertisement window size, flag information, the source port number, the destination port number and the protocol ID in a packet. Further, for example, when the communication quality is measured for each sending terminal, plural packet information storage areas are prepared for each address of a terminal as the sending terminal. Then, for example, the information writing means 2 stores, in a packet information storage area, information corresponding to a combination of the acknowledgment number, the advertisement window size, the flag information, the source port number, the destination port number, the protocol ID and the recipient address in a packet. Further, for example, when the communication quality is measured for each port, plural packet information storage areas are prepared for each combination of the source port number and the destination port number. Then, for example, the information writing means 2 stores, in a packet information storage area, information corresponding to a combination of the acknowledgment number, the advertisement window size, the flag information, the source port number, the destination port number, the sender address and the recipient address in a packet.

Figure 8:
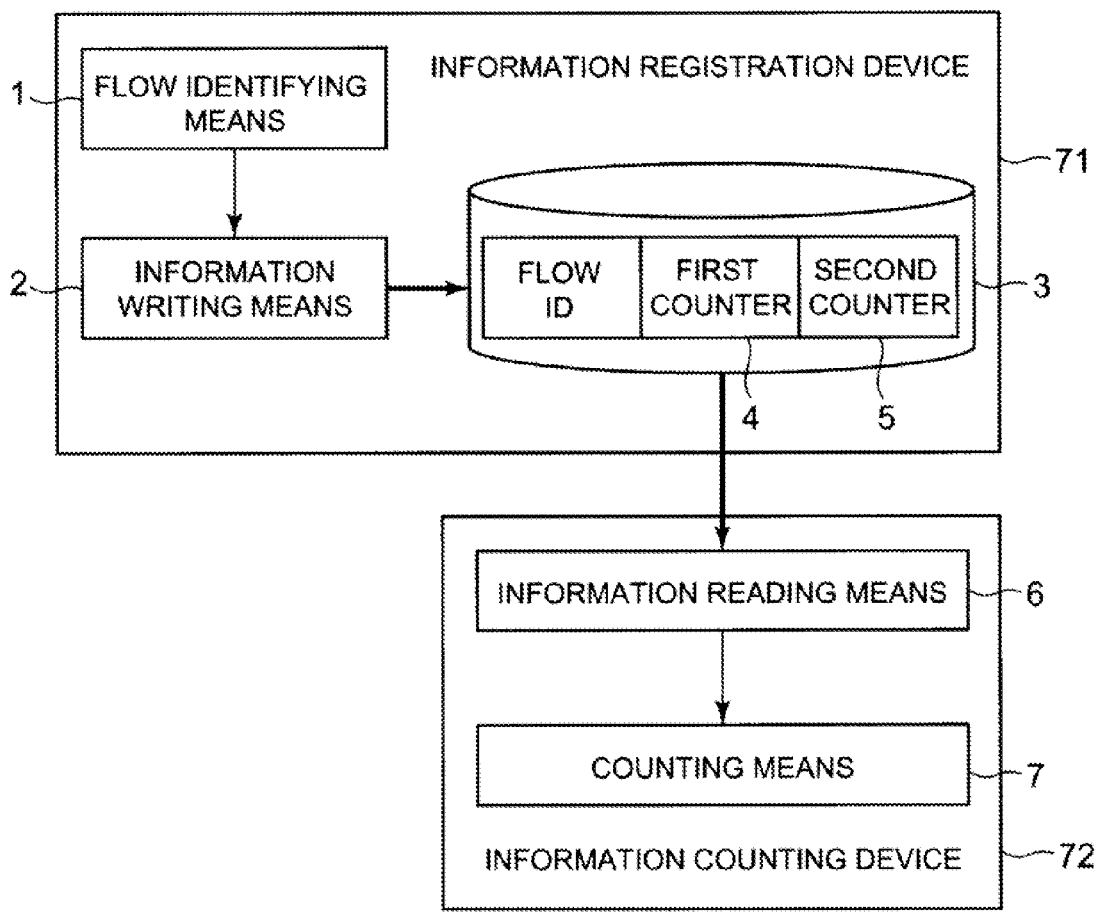
[FIG. 8] It depicts a block diagram showing an example of such a configuration that a section for performing processing upon receiving each packet and a section for performing information counting processing are implemented by different devices.

Further, in the above-mentioned exemplary embodiment, the description is made by taking the case as an example in which the flow identifying means 1, the information writing means 2, the packet information holding means 3, the information reading means 6 and the counting means 7 are provided in one device, but respective means may not be provided in the same device. For example, a section for performing processing upon receiving each packet and a section for reading information stored in the plural packet information storage areas and performing counting may be implemented in different devices. FIG. 8 is a block diagram showing an example of such an exemplary embodiment. In the example shown in FIG. 8, a packet loss frequency measuring system is configured to include an information registration device 71 and an information counting device 72. For example, the information registration device 71 and the information counting device 72 are connected through a communication network. The information registration means 71 includes the flow identifying means 1, the information writing means 2 and the packet information holding means 3. The information counting device 72 includes the information reading means 6 and the counting means 7. Since the operation of the components given the same reference numerals as those in FIG. 2 is the same as that in the above-mentioned exemplary embodiment, the description thereof will be omitted.

For example, the information registration means 71 is applied to each of the devices 21 to 25 shown in FIG. 1, and the information counting device 25 is applied to the server 31 shown in FIG. 1.

It may be configured such that the flow identifying means 1 is provided in each of the devices 21 to 25 shown in FIG. 1, the information writing means 2, the packet information holding means 3, the information reading means 6 and the counting means 7 are provided in the server 31 shown in FIG. 1. In this case, after identifying the flow of a received packet, the flow identifying means 1 in each of the devices 21 to 25 sends the packet to the server 31.

The packet information holding means 3 may be configured as a distributed database in the communication network. Each computer in the communication network may serve as each individual counter corresponding to one flow. For example, computer A serving as the first counter 4 shown in FIG. 8 and computer B serving as the second counter 5 may be connected to the information registration device 71 and the information counting device 72 (see FIG. 8). The information writing means may select either of the computers A and B, send the selected computer information corresponding to the acknowledgment number or the like, and store the information on the computer. The information counting device 72 has only to receive information from respective computers and count information commonly stored.

Figure 9:
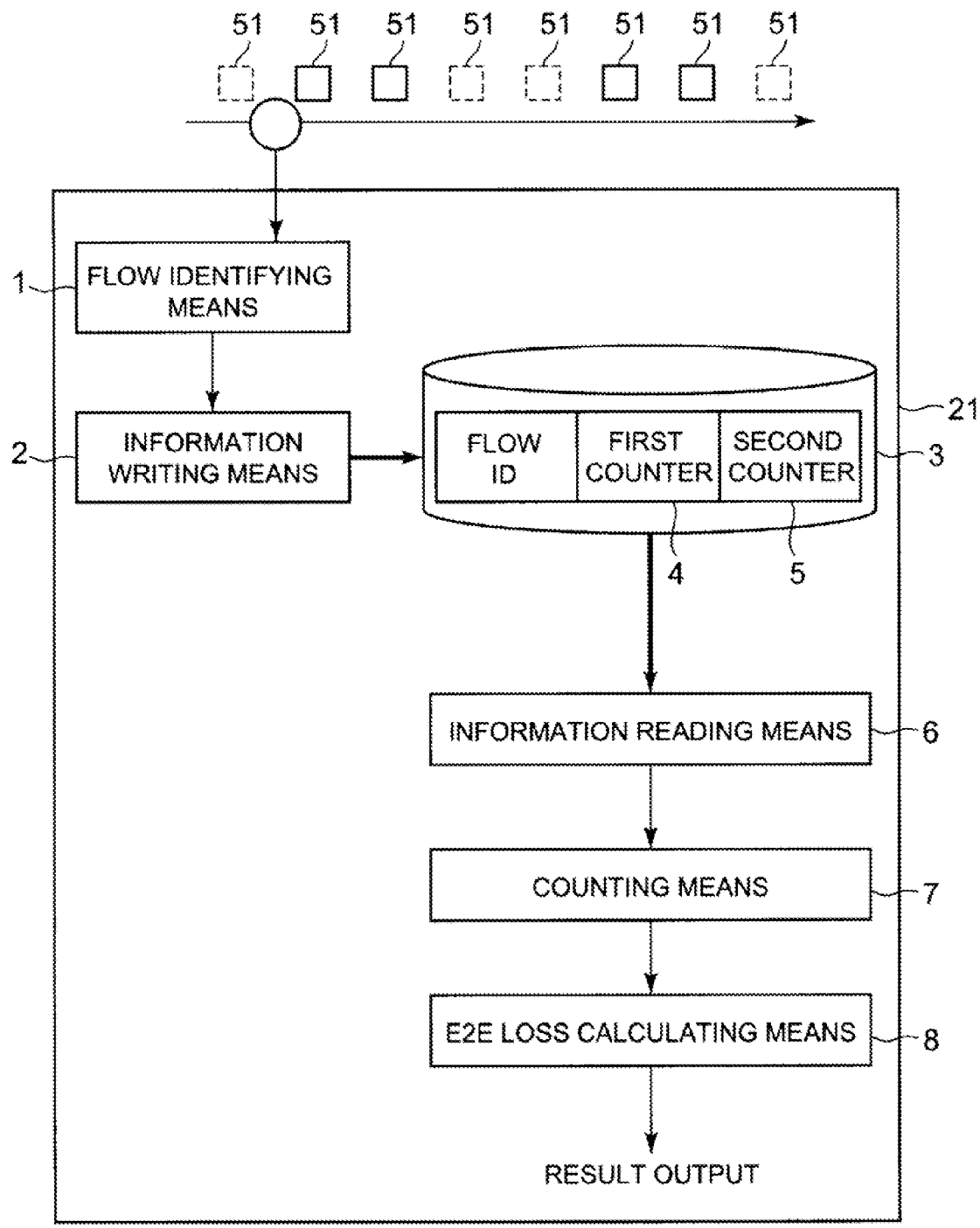
[FIG. 9] It depicts a block diagram showing another exemplary embodiment of the present invention.

FIG. 9 is a block diagram showing another exemplary embodiment of the present invention. In the exemplary embodiment shown in FIG. 9, the number of packet losses is estimated from the packet loss frequency. The packet loss frequency measuring system shown in FIG. 9 includes the flow identifying means 1, the information writing means 2, the packet information holding means 3, the information reading means 6, the counting means 7 and E2E loss calculating means 8. Since the operation of the flow identifying means 1, the information writing means 2, the packet information holding means 3, the information reading means 6 and the counting means 7 is the same as that in the exemplary embodiment shown in FIG. 2, the description thereof will be omitted.

In step B2 (see FIG. 6), since the number of "1s" in a bit string obtained by the AND operation, for example, is a value representing the packet loss frequency, it can be said that the more the number of "1s," the more the number of packet losses. However, the counting result of "1s" in the bit string does not always represent the number of occurrences of packet loss. For example, when the information writing means 2 employs a method of selecting a counter at random and packets having the same acknowledgment number are received plural times, the same counter may be selected. In this case, "1" is not stored in a bit position corresponding to the acknowledgment number in the other counter and hence does not appear as "1" in a bit string obtained by the AND operation.

When packet loss has occurred once, the E2E loss calculating means 8 uses the probability that the information writing means 2 stores common information in counters equal in number to or more than the common number among the plural counters corresponding to the same flow to correct the counting result counted by the counting means 7 so as to estimate the number of occurrences of packet loss. In the following, the probability that the information writing means 2 stores common information in counters equal in number to or more than the common number among the plural counters corresponding to the same flow when packet loss has occurred once is referred to as the probability of occurrence. If the probability of occurrence is denoted as K, the E2E loss calculating means 8 has only to divide, by the probability of occurrence K, the counting result counted by the counting means 7 and set the dividing result as the estimated value for the number of occurrences of packet loss. The E2E loss calculating means 8 may send the server 31 (see FIG. 1) the estimated value for the number of occurrences of packet loss so that the server 31 will store the number of occurrences of packet loss estimated in each individual packet loss frequency measuring system (each of the devices 21 to 25 shown in FIG. 1).

The probability of occurrence is decided by a combination of one or more elements among the following four elements: The first element is an algorithm by which the information writing means 2 selects one counter from among plural counters (plural counters corresponding to one flow). The second element is the number of counters corresponding to one flow. The third element is the common number. The common number is a counting condition for information to be counted by the counting means 7 to see in how many counters each piece of information stored in the counters by the information writing means 2 according to the field values including at least the acknowledgment number in the packet is commonly stored. The fourth element is the kind of communication protocol for defining the transmission mode of the acknowledgment number.

For example, suppose that the first element is the round-robin method on a flow-by-flow basis. Then, suppose that the second element is numeric value X and the third element is also numeric value X. In other words, the value for the second element matches the value for the third element. In this case, though an exception may exist due to the fourth element, the counting result of the counting means 7 (the number of pieces of information commonly stored in counters corresponding in number to the common number, and in the example shown in FIG. 4, it is three) generally becomes the number of packet losses as-is. When the counting result of the counting means 7 does not become the number of packet losses as-is, the E2E loss calculating means 8 may perform maximum likelihood estimation or the like to estimate the number of packet losses. The following will give an example in which the E2E loss calculating means 8 estimates the number of packet losses.

Suppose that the first element is the method of selecting one counter at random from the plural counters corresponding to one flow. Suppose also that the second element is two and the third element and two. In other words, the number of counters for one flow is two and the common number is also two. Suppose further that the fourth element is an algorithm in which upon detecting packet loss, the receiving terminal side sends the sending terminal side two identical acknowledgment numbers. In this case, the number of times the same acknowledgment number is sent from the data receiving terminal side to the sending terminal is only twice. If two packets including the same acknowledgment number are received and common information corresponding to the acknowledgment number is stored in two counters, respectively, the counting means 7 can count the information as one piece of information. In this example, since the counter selection algorithm is the random method, the probability of storing common information in the two counters, respectively, is one-half. To be specific, when the acknowledgment number is received for the first time, the probability of storing information corresponding to the acknowledgment number in the first counter is one-half and the probability of storing it in the second counter is one-half. When the acknowledgment number is received for the second time, the probability of storing information corresponding to the acknowledgment number in the first counter is one-half and the probability of storing it in the second counter is one-half. Therefore, the probability that the information corresponding to this acknowledgment number is stored in the first counter and the second counter and becomes "1" as a result of the AND operation (probability of occurrence) is one-half, the probability that the information is redundantly stored in the first counter and hence becomes "0" as a result of the AND operation is one-quarter, and the probability that the information is redundantly stored in the second counter and hence becomes "0" as a result of the AND operation is one-quarter. Thus, the E2E loss calculating means 8 divides the counting result of the counting means 7 by one-half as the probability of occurrence to estimate the dividing result as the number of occurrences of packet loss. For example, if the counting result of the counting means 7 is 50, 50/($\frac{1}{2}$) is calculated to estimate that the number of occurrences of packet loss is 100.

Further, for example, suppose that the first element is a method of selecting a counter in such a manner that the probability of selecting the first counter is one third and the probability of selecting the second counter is two thirds. Suppose further that the second element is two and the third element is two. In addition, suppose that the fourth element is the algorithm in which upon detecting packet loss, the receiving terminal side sends the sending terminal side two identical acknowledgment numbers. In this case, when packet loss has occurred once, the probability of storing common information in the two counters, respectively, is four ninths. To be specific, when the acknowledgment number is received for the first time, the probability of storing information corresponding to the acknowledgment number in the first counter is one third and the probability of storing it in the second counter is two thirds. When the acknowledgment number is received for the second time, the probability of storing information corresponding to the acknowledgment number in the first counter is one third and the probability of storing it in the second counter is one third. Therefore, the probability that the information corresponding to this acknowledgment number is stored in the first counter and the second counter and becomes "1" as a result of the AND operation (probability of occurrence) is four ninths, the probability that the information is redundantly stored in the first counter and hence becomes "0" as a result of the AND operation is one ninth, and the probability that the information is redundantly stored in the second counter and hence becomes "0" as a result of the AND operation is four ninths. Thus, the E2E loss calculating means 8 divides the counting result of the counting means 7 by four ninths as the probability of occurrence to estimate the dividing result as the number of occurrences of packet loss. For example, if the counting result of the counting means 7 is 50, 50/($\frac{4}{9}$) is calculated to estimate that the number of occurrences of packet loss is 112.5 times.

The E2E loss calculating means 8 may calculate the number of occurrences. Further, the probability of occurrence corresponding to a combination of the contents of the respective elements may be predetermined so that the E2E loss calculating means 8 will use the probability of occurrence to estimate the number of occurrences of packet loss. Alternatively, the probabilities of occurrence corresponding to the contents of elements in combinations of at lest one or more of the first to fourth elements may be predetermined, respectively, and probability information storing means (not shown) storing information in which the combinations of elements and the probabilities of occurrence are associated with one another may be provided in the packet loss frequency measuring system. Then, from among the pieces of information stored in the probability information storing means, the E2E loss calculating means 8 may search for a probability of occurrence corresponding to the counter selection algorithm in the packet loss frequency measuring system itself, the number of counters corresponding to one flow, the common number and the communication algorithm between terminals to estimate the number of occurrences of packet loss using the probability of occurrence.

If the probability of occurrence corresponding to the content of an element cannot be calculated accurately, a relationship between the number of packet losses and the number of appearances of data to be counted by the counting means 7 may be statistically determined under the condition indicated by the content of the element.

However, depending on the protocol as the fourth element, the change in observation probability due to the fact that the numeric values for the second element and the third element do not match may be so negligible that there will be no problem if the E2E loss calculating means 8 does not correct the counting result of the counting means 7 stochastically. For example, when the fourth element is TCP, the third element is three. At this time, the number of times an acknowledgment number is duplicated upon occurrence of packet loss is larger than "three" for the third element. For example, ten to twenty identical acknowledgment numbers may continue depending on the network situation. Therefore, there is a high possibility that "1" is stored in all corresponding bits of Bloom filters upon occurrence of packet loss even if the second element is "two" or the first element is the round-robin method or the random method on a device-by-device basis. In such a case, the E2E loss calculating means 8 may set the counting result of the counting means 7 as the number of occurrences of packet loss without making a correction.

The components other than the E2E loss calculating means 8 are the same as those already described above.

The packet loss frequency measuring system may also estimate a packet loss rate from the number of packet losses. For example, the packet loss frequency measuring system may include means for calculating throughput and dividing it by the number of packet losses to calculate the packet loss rate.

Figure 10:
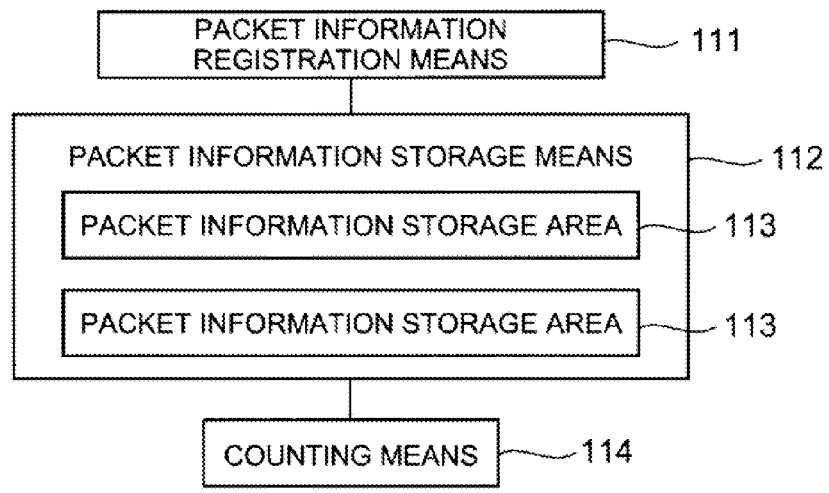
[FIG. 10] It depicts a block diagram showing the summary of the present invention.

Next, the summary of the present invention will be described. FIG. 10 is a block diagram showing the summary of the present invention. The packet loss frequency measuring system of the present invention includes packet information storage means 112, packet information registration means 111 and counting means 114.

The packet information storage means 112 (e.g., the packet information holding means 3) has plural packet information storage areas 113 (e.g., the counters 4 and 5) for storing information corresponding to field values including at least an acknowledgment number in a packet.

The packet information registration means 111 (e.g., the information writing means 2) selects one of the plural packet information storage areas 113 when receiving a packet, and stores, in the selected packet information storing area 113, information corresponding to the field values including at least the acknowledgment number in the received packet.

The counting means 114 counts the number of pieces of information commonly stored in packet information storage areas equal in number to or more than a predetermined number (e.g., the common number).

According to such a configuration, the packet loss frequency can be measured at low processing costs.

In the aforementioned exemplary embodiments, a configuration is also disclosed, in which there is provided classification means (e.g., the flow identifying means 1) for classifying packets into groups from a combination of at least some of items in a packet among the sender address, the recipient address, the source port number, the destination port number, the protocol ID and the port number of the packet loss frequency measuring system so that the packet information registration means 111 will perform, in units of groups, processing for storing, in the selected packet information storing area 113, information corresponding to the field values including at least the acknowledgment number in the received packet. According to such a configuration, the packet loss frequency can be measured on a flow-by-flow basis.

Further, in the aforementioned exemplary embodiments, a configuration is disclosed, in which when the packet information registration means 111 stores, in the selected packet information storing area 113, information corresponding to the field values including at least the acknowledgment number in the packet, 1 is stored in bit positions corresponding to the values in a bit string having a predetermined number of bits as information corresponding to the values.

Further, in the aforementioned exemplary embodiments, a configuration is disclosed, in which the packet information registration means 111 stores information, corresponding to the field values including at least the acknowledgment number in the packet, in the selected packet information storing area 113 as an array.

Further, in the aforementioned exemplary embodiments, a configuration is disclosed, in which information corresponding to the field values including at least the acknowledgment number in the packet is determined by converting a value using the hash function.

Further, in the aforementioned exemplary embodiments, a configuration is disclosed, in which the packet information registration means 111 uses the hash function to convert the field values including at least the acknowledgment number in the packet according to an algorithm such as Bloom Filter or Space-Code Bloom Filter or Multi-Resolution Space-Code Bloom Filter.

Further, in the aforementioned exemplary embodiments, a configuration is disclosed, in which the packet information registration means stores, in the selected packet information storing area, information corresponding to a combination of the acknowledgment number and one or more of the flag information, the advertisement window size, the sender address, the recipient address, the source port number, the destination port number and the protocol ID.

Further, in the aforementioned exemplary embodiments, a configuration is disclosed, in which the packet information registration means 111 stores, in the selected packet information storing area, information corresponding to a combination of the field values including at least the acknowledgment number in the packet and the port number of the packet loss frequency measuring system.

Further, in the aforementioned exemplary embodiments, a configuration is disclosed, in which the packet information registration means 111 selects a packet information storage area by any one of a random selection method, a round-robin method or a method of selecting any of the packet information storage areas according to the predetermined selection probability of each packet information storage area.

Figure 11:
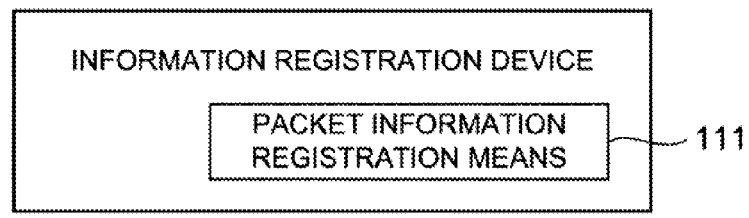
[FIG. 11] It depicts a block diagram showing an example of the minimum configuration of an information registration device of the present invention.

FIG. 11 is a block diagram showing an example of the minimum configuration of an information registration device of the present invention. The information registration device of the present invention includes packet information registration means 111 (e.g., the information writing means 2) for selecting one of plural packet information storage areas when receiving a packet and storing, in the selected packet information storing area, information corresponding to the field values including at least the acknowledgment number in the received packet. In the aforementioned exemplary embodiments, a configuration of the information registration device is disclosed, which further includes packet information storage means (e.g., the packet information holding means 3) having plural packet information storage areas (e.g., the counters 4 and 5) for storing information corresponding to the field values including at least the acknowledgment number in the packet.

Figure 12:
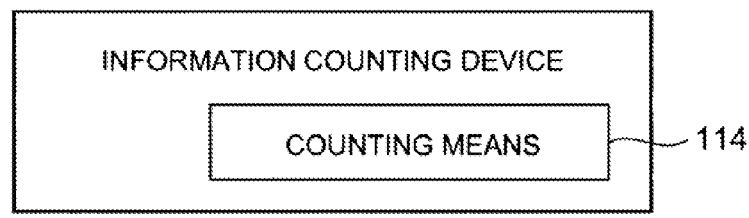
[FIG. 12] It depicts a block diagram showing an example of the minimum configuration of an information counting device of the present invention.
Figure 13:
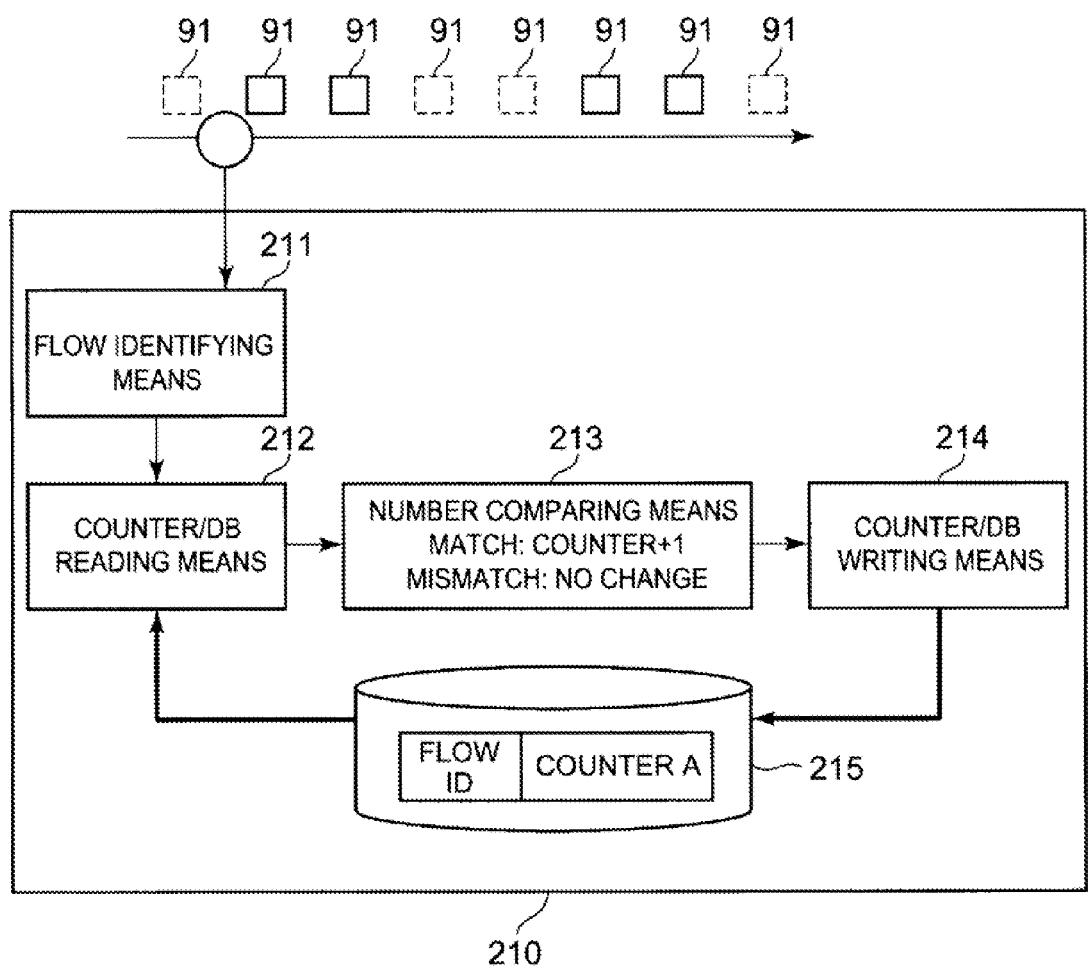
[FIG. 13] It depicts a block diagram showing an example of measuring equipment for detecting packet loss by a method described in Non Patent Literature 1.

FIG. 12 is a block diagram showing an example of the minimum configuration of an information counting device of the present invention. The information counting of the present invention includes counting means 114 (e.g., the counting means 7) for referring to information stored in plural packet information storage areas (e.g., counters 4 and 5) storing information corresponding to the field values including at least the acknowledgment number in a packet to count the number of pieces of information commonly stored in packet information storage areas equal in number to or more than a predetermined number.

In the aforementioned exemplary embodiments, characteristic configurations of the packet loss frequency measuring system as shown in the following (1) to (10) are shown. Characteristic configurations of the information registration device as shown in the following (11) to (13) are also shown. Further, characteristic configurations of the information counting device as shown in the following (14) to (15) are shown.

(1) A packet loss frequency measuring system including: a packet information storage section having plural packet information storage areas for storing information corresponding to the field values including at least the acknowledgment number in a packet; a packet information registration section for selecting one of the plural packet information storage areas upon receiving a packet and storing, in the selected packet information storing area, information corresponding to the field values including at least the acknowledgment number in the received packet; and a counting section for counting the number of pieces of information commonly stored in packet information storage areas equal in number to or more than a predetermined number.

(2) The packet loss frequency measuring system further including a classification section for classifying packets into groups from a combination of at least some of items in a packet among the sender address, the recipient address, the source port number, the destination port number, the protocol ID and the port number of the packet loss frequency measuring system, wherein the packet information registration section performs, in units of groups, processing for storing, in the selected packet information storing area, information corresponding to the field values including at least the acknowledgment number in the received packet.

(3) The packet loss frequency measuring system wherein when the packet information registration section stores, in the selected packet information storing area, information corresponding to the field values including at least the acknowledgment number in the packet, 1 is stored in bit positions corresponding to the values in a bit string having a predetermined number of bits as information corresponding to the values.

(4) The packet loss frequency measuring system wherein the packet information registration section stores, in the selected packet information storing area, information corresponding to the field values including at least the acknowledgment number in the packet.

(5) The packet loss frequency measuring system wherein the packet information registration section uses a hash function to convert the values of information corresponding to the field values including at least the acknowledgment number in the packet.

(6) The packet loss frequency measuring system wherein the packet information registration section uses the hash function to convert the field values including at least the acknowledgment number in the packet according to an algorithm such as Bloom Filter or Space-Code Bloom Filter or Multi-Resolution Space-Code Bloom Filter.

(7) The packet loss frequency measuring system wherein the packet information registration section stores, in the selected packet information storing area, information corresponding to a combination of the acknowledgment number and one or more of the flag information, the advertisement window size, the sender address, the recipient address, the source port number, the destination port number and the protocol ID.

(8) The packet loss frequency measuring system wherein the packet information registration section stores, in the selected packet information storing area, information corresponding to a combination of the field values including at least the acknowledgment number in the packet and the port number of the packet loss frequency measuring system.

(9) The packet loss frequency measuring system wherein the packet information registration section selects a packet information storage area by a random selection method, a round-robin method or a method of selecting any of the packet information storage areas according to the predetermined selection probability of each packet information storage area.

(10) A packet loss frequency measuring system including: packet information storage means having plural packet information storage areas for storing information corresponding to the field values including at least the acknowledgment number in a packet; packet information registration means for selecting one of the plural packet information storage areas upon receiving a packet and storing, in the selected packet information storing area, information corresponding to the field values including at least the acknowledgment number in the received packet; and counting means for counting the number of pieces of information commonly stored in packet information storage areas equal in number to or more than a predetermined number.

(11) An information registration device including a packet information registration section for selecting one of plural packet information storage areas upon receiving a packet and storing, in the selected packet information storing area, information corresponding to the field values including at least the acknowledgment number in the received packet.

(12) The information registration device including a packet information storage section having plural packet information storage areas for storing information corresponding to the field values including at least the acknowledgment number in the packet.

(13) The information registration device including packet information registration means for selecting one of the plural packet information storage areas upon receiving a packet and storing, in the selected packet information storing area, information corresponding to the field values including at least the acknowledgment number in the received packet.

(14) An information counting device including a counting section for referring to information stored in plural packet information storage areas storing information corresponding to field values including at least the acknowledgment number in a packet to count the number of pieces of information commonly stored in packet information storage areas equal in number to or more than a predetermined number.

(15) The information counting device including counting means for referring to information stored in plural packet information storage areas storing information corresponding to the field values including at least the acknowledgment number in the packet to count the number of pieces of information commonly stored in packet information storage areas equal in number to or more than the predetermined number.

While the invention is described with reference to the exemplary embodiments, the invention is not intended to be limited to the exemplary embodiments. Various changes that will be appreciated by those skilled in the art can be made to the configurations and details of the invention within the scope of the invention.

This application is the National Phase of PCT/JP2009/004966, filed Sep. 29, 2009, which claims priority based upon Japanese Patent Application No. 2008-273750 filed Oct. 24, 2008, which is incorporated by reference herein in its entirety.

INDUSTRIAL APPLICABILITY

The present invention is preferably applied to a packet loss frequency measuring system for measuring the packet loss frequency.

REFERENCE SIGNS LIST

1 Flow Identifying Means
2 Information Writing Means
3 Packet Information Holding Means
4, 5 Packet Information Storage Area
6 Information Reading Means
7 Counting Means

The invention claimed is:
1. An packet loss frequency measuring system comprising:
a packet information storage section having a plurality of packet information storage areas for storing information corresponding to field values including at least an acknowledgment number in a packet;
a packet information registration section for selecting one of the plurality of packet information storage areas upon receiving a packet and storing, in the selected packet information storing area, information corresponding to the field values including at least the acknowledgment number in the received packet; and a counting section for counting the number of pieces of information commonly stored in packet information storage areas equal in number to or more than a predetermined number.

2. The packet loss frequency measuring system according to claim 1, further comprising
a classification section for classifying packets into groups from a combination of at least some of items among a sender address, a recipient address, a source port number, a destination port number, a protocol ID and a port number of the packet loss frequency measuring system in a packet,
wherein the packet information registration section performs, in units of groups, processing for storing, in the selected packet information storing area, information corresponding to the field values including at least the acknowledgment number in the received packet.

3. The packet loss frequency measuring system according to claim 1, wherein when storing, in the selected packet information storing area, the information corresponding to the field values including at least the acknowledgment number in the packet, the packet information registration section stores 1 in bit positions corresponding to the values in a bit string having a predetermined number of bits as information corresponding to the values.

4. The packet loss frequency measuring system according to claim 1, wherein the packet information registration section stores the information, corresponding to the field values including at least the acknowledgment number in the packet, in the selected packet information storing area as an array.

5. The packet loss frequency measuring system according to claim 1, wherein the packet information registration section converts the values using a hash function to determine the information corresponding to the field values including at least the acknowledgment number in the packet.

6. The packet loss frequency measuring system according to claim 5, wherein the packet information registration section uses the hash function to convert the field values including at least the acknowledgment number in the packet according to an algorithm of Bloom Filter or Space-Code Bloom Filter or Multi-Resolution Space-Code Bloom Filter.

7. The packet loss frequency measuring system according to claim 1, wherein the packet information registration section stores, in the selected packet information storing area, information corresponding to a combination of the acknowledgment number and any one or more of flag information, an advertisement window size, a sender address, a recipient address, a source port number, a destination port number and a protocol ID.

8. The packet loss frequency measuring system according to claim 1, wherein the packet information registration section stores, in the selected packet information storing area, information corresponding to a combination of the field values including at least the acknowledgment number in the packet and a port number of the packet loss frequency measuring system.

9. The packet loss frequency measuring system according to claim 1, wherein the packet information registration section selects any of the packet information storage areas by any one of a random selecting method, a round-robin method and a method of selecting any of the packet information storage areas according to a predetermined selection probability of each packet information storage area.

10. An information registration device comprising:
a packet information registration section for selecting one of a plurality of packet information storage areas upon receiving a packet and storing, in the selected packet information storing area, information corresponding to field values including at least an acknowledgment number of the received packet; and
a counting section for counting the number of pieces of information commonly stored in packet information storage areas equal in number to or more than a predetermined number.

11. The information registration device according to claim 10, further comprising a packet information storage section having the plurality of packet information storage areas for storing information corresponding to the field values including at least the acknowledgment number in a packet.

12. A packet loss frequency measuring method comprising:
selecting one of a plurality of packet information storage areas upon receiving a packet and storing, in the selected packet information storing area, information corresponding to field values including at least an acknowledgment number in the received packet; and
counting the number of pieces of information commonly stored in packet information storage areas equal in number to or more than a predetermined number.

13. The packet loss frequency measuring method according to claim 12, further comprising
classifying packets into groups from a combination of at least some of items among a sender address, a recipient address, a source port number, a destination port number, a protocol ID and a port number of the packet loss frequency measuring system in a packet,
wherein processing for storing, in the selected packet information storing area, information corresponding to the field values including at least the acknowledgment number in the received packet is performed in units of groups.

14. The packet loss frequency measuring method according to claim 12, wherein when the information corresponding to the field values including at least the acknowledgment number in the packet is stored in the selected packet information storing area, 1 is stored in bit positions corresponding to the values in a bit string having a predetermined number of bits as information corresponding to the values.

15. The packet loss frequency measuring method according to claim 12, wherein the information corresponding to the field values including at least the acknowledgment number in the packet is stored in the selected packet information storing area as an array.

16. The packet loss frequency measuring method according to claim 12, wherein the information corresponding to the field values including at least the acknowledgment number in the packet is determined by converting the values using a hash function.

17. The packet loss frequency measuring method according to claim 16, wherein the hash function is used to convert the field values including at least the acknowledgment number in the packet according to an algorithm of Bloom Filter or Space-Code Bloom Filter or Multi-Resolution Space-Code Bloom Filter.

18. The packet loss frequency measuring method according to claim 12, wherein information corresponding to a combination of the acknowledgment number and any one or more of flag information, an advertisement window size, a sender address, a recipient address, a source port number, a destination port number and a protocol ID is stored in the selected packet information storing area.

19. The packet loss frequency measuring method according to claim 12, wherein information corresponding to a combination of the field values including at least the acknowledgment number in the packet and a port number of the packet loss frequency measuring system is stored in the selected packet information storing area.

20. The packet loss frequency measuring method according to claim 12, wherein any of packet information storage areas is selected by any one of a random selecting method, a round-robin method and a method of selecting any of the packet information storage areas according to a predetermined selection probability of each packet information storage area.

* * * * *